United States Patent [19]
Roesinger et al.

[11] Patent Number: 5,343,459
[45] Date of Patent: Aug. 30, 1994

[54] VARYING A SCANNING BEAM AS A FUNCTION OF BEARING TEMPERATURE OF AN OPTICAL LENS ACTUATOR

[75] Inventors: Andreas Roesinger, Hanover; Guenter Noetzel, Diekholzen, both of Fed. Rep. of Germany

[73] Assignee: Robert Bosch GmbH, Stuttgart, Fed. Rep. of Germany

[21] Appl. No.: 39,265

[22] PCT Filed: Sep. 19, 1991

[86] PCT No.: PCT/DE91/00746
§ 371 Date: Apr. 16, 1993
§ 102(e) Date: Apr. 16, 1993

[87] PCT Pub. No.: WO92/07357
PCT Pub. Date: Apr. 30, 1992

[30] Foreign Application Priority Data
Oct. 17, 1990 [DE] Fed. Rep. of Germany ....... 4032871

[51] Int. Cl.$^5$ .............................................. G11B 7/00
[52] U.S. Cl. ...................................... 369/116; 369/13; 369/44.25; 369/100
[58] Field of Search ............... 369/116, 100, 13, 44.25, 369/44.32

[56] References Cited

U.S. PATENT DOCUMENTS

| | | | |
|---|---|---|---|
| 4,574,371 | 3/1986 | Takemura et al. | 369/100 |
| 4,695,714 | 9/1987 | Kimizuka | 250/205 |
| 4,700,057 | 10/1987 | Sakai | 250/205 |
| 4,817,098 | 3/1989 | Horikawa | 372/29 |
| 4,834,477 | 5/1989 | Tomita | 350/6.2 |
| 5,091,897 | 2/1992 | Otokawa et al. | 369/13 |
| 5,177,726 | 1/1993 | Terada | 369/44.27 |

OTHER PUBLICATIONS

Patent Abstracts of Japan, vol. 11, No. 119 (E-499), publ. Apr. 14, 1987, abstracting Japanese publication 61-265 885-A of Nov. 25, 1986, inventor Ono Yuzo, assignee NEC Corp.

Patent Abstracts of Japan, vol. 13, No. 572 (P-978), publ. Dec. 18, 1989, abstracting Japanese publication 01-241 026-A of Sep. 26, 1989, inventor H. Yokota, assignee Alpine Electron Inc.

*Primary Examiner*—Paul M. Dzierzynski
*Assistant Examiner*—Kim-Kwok Chu
*Attorney, Agent, or Firm*—Frishauf, Holtz, Goodman & Woodward

[57] ABSTRACT

A circuit arrangement for scanning optical recording carriers comprises a scanning device, a first control loop for focusing a light beam of the scanning device directed onto the information plane of the recording carrier and a second control loop for guiding the light beam on an information track. The first control loop exhibits a first control amplifier which is supplied with focus error signals and the second control loop exhibits a second control amplifier which is supplied with track error signals. The control amplifiers drive actuators which mechanically guide the scanning device. To compensate for the temperature response of the control gain, controlling elements connected to temperature sensors via gain controllers are arranged in the first and second control loop, which controlling elements temperature-dependently change the gains.

4 Claims, 1 Drawing Sheet

VARYING A SCANNING BEAM AS A FUNCTION OF BEARING TEMPERATURE OF AN OPTICAL LENS ACTUATOR

This application is a national phase filing under 35 USC §371 of international application PCT/DE91/00746, filed Sep. 17, 1991.

BACKGROUND OF THE INVENTION

1. Field of the Invention

The invention relates to a circuit arrangement for scanning optical recording carriers.

2. Description of Related Art

In such a circuit arrangement, data which are stored in information tracks on the information plane of the optical recording carrier are accessed by a scanning device of a laser light source, optics and a group of photodetectors. A scanning light beam emitted by the light source is reflected by the information plane and directed through the optics onto the photodetectors. By evaluating the signals of the individual photodetectors, information signals are obtained and supplied to subsequent signal processing circuits and devices. The information signals can be audio, video or data signals.

To achieve a correct reproduction of the information signals, both accurate focusing of the light beam directed onto the information plane of the recording carrier and precise guidance of the light beam along the information tracks is required. Apart from a coarse drive which can be constructed, for example, as spindle in the case of a disc-shaped recording carrier, there is precision tracking by the scanning device in that actuators preferably constructed as electromagnetic microdrives mechanically move its optics. The optics are moved along their optical axis for focusing and shifted perpendicularly to the optical axis or tilted by a small angle for tracking.

The scanning device tracking is initiated by focus error signals and track error signals which are obtained by further evaluation of the signals of the individual photodetectors. The scanning device, the actuators and additionally provided control amplifiers form control loops for the guidance of the scanning device, namely a first control loop for the focus correction and a second control loop for the track correction.

When the control loops operate optimally, the scanning device is always displaced in such a manner that its deviation from the ideal position is just compensated for. This operating mode of the control loops is significantly determined by the gains in the overall control loops, the control gains. To compensate for tolerances of control loop elements, gain controllers are provided by means of which the control gain is set during calibration and adjustment measures during the manufacture of the device.

It has been found in practice that in spite of careful setting of the gain controllers, correct reproduction of the information signals is no longer possible if the circuit arrangement is to be operated under other environmental conditions, particularly other temperatures, than prevailed during the calibration of the control gain. This state can occur even if a device with such a circuit arrangement, for example a CD player, is to be used in the colder season in unheated rooms, or in the other case is located in a particularly hot environment and in addition is exposed to the heat dissipation of other loads. Especially extreme conditions also occur when a device is operated in motor vehicles.

SUMMARY OF THE INVENTION

The invention is based on the object of eliminating the temperature-dependent susceptibility to drift of a circuit of the type initially mentioned.

The invention is based on the finding that the control gains in the control loops for guiding the scanning device are changed by temperature-dependent control loop elements. In particular, the mechanical bearings in which the optics of the scanning device are movably supported have been identified as temperature-dependent control loop elements. The resistance to be overcome by the actuators when moving the optics increases with decreasing temperature and vice versa. This leads to it not being possible to achieve adequate guidance of the scanning device at low temperatures whereas control oscillations occur at high temperatures. The consequence of both phenomena is that it is not possible to guide the scanning device into its ideal position.

Eliminating the temperature-dependence of the bearings by mechanical means would be expensive. However, since the bearings represent control loop elements in the control system sense, there is the possibility of electronically compensating for their effect on the control gain. For this purpose, controlling elements are inserted into the control loops which are operated in the opposite direction to the change in mechanical resistance of the bearings. The controlling elements are operated by gain controllers which are supplied with signals from temperature sensors which detect the environmental temperature of the bearings. The temperature-dependence of the bearings can be compensated for when their temperature/resistance characteristic is simulated by the gain controllers in the oppositely directed sense.

The electronic solution has the additional advantage that other temperature-dependent influences on the control gain can also be compensated for regardless of their precise origin. There is furthermore the possibility of exercising control over temperature/resistance characteristics which have a non-linear or even discontinuous variation. Temperature/resistance characteristics with discontinuous variation having its origin in a temperature-dependent change in the molecular chains occur especially in the case of bearing hinges of plastic parts. Furthermore, it is no longer necessary to maintain a particular operating temperature during a calibration of the control gain. A device calibrated in the cold state also operates correctly within the entire temperature range for which the compensation is designed.

According to a further development, the controlling elements of the first and second control loop are connected to a common gain controller.

If the optics of the scanning device are moved in one and the same bearing both in a displacement for the purpose of focusing and in a movement for tracking or if the scanning device is guided at least in similar bearings in both types of movement, which will be the case as a rule, the same temperature/resistance characteristics can be assumed. The restriction to a common gain controller for both control loops not only reduces the circuit complexity but also achieves synchronism in influencing the control gains in both control loops in a simple manner. This aspect is essential particularly in the case of very complicated temperature/resistance characteristics, the simulation of which is complex. Where there are different control gains in the control loops but qualitatively identical temperature/resistance characteristics, the controlling element in the control loop having the characteristic with the lesser slope can also be driven via a voltage divider from the gain controller.

This solution has the advantage that, as the power of the light beam changes, the control gain is changed jointly in both control loops. It is thus not necessary here to produce any circuit linking between the control loops and, instead, there is a mandatory optical linking through the light beam, from the deviation of which its focal point from the information plane or its direction from the information track focus error signals and track error signals are obtained by evaluating the signals of the individual photodetectors. The power of the light beam influences the magnitude of these error signals.

BRIEF FIGURE DESCRIPTION

Further developments and advantageous embodiments are obtained from the claims, the further description and the drawing, which represent illustrative embodiments of both independent solutions and in which drawing:

FIG. 1 shows a block diagram of a first circuit arrangement for scanning optical recording carriers, and FIG. 2 shows a block diagram of a second circuit arrangement for scanning optical recording carriers.

DETAILED DESCRIPTION

Figure 1:
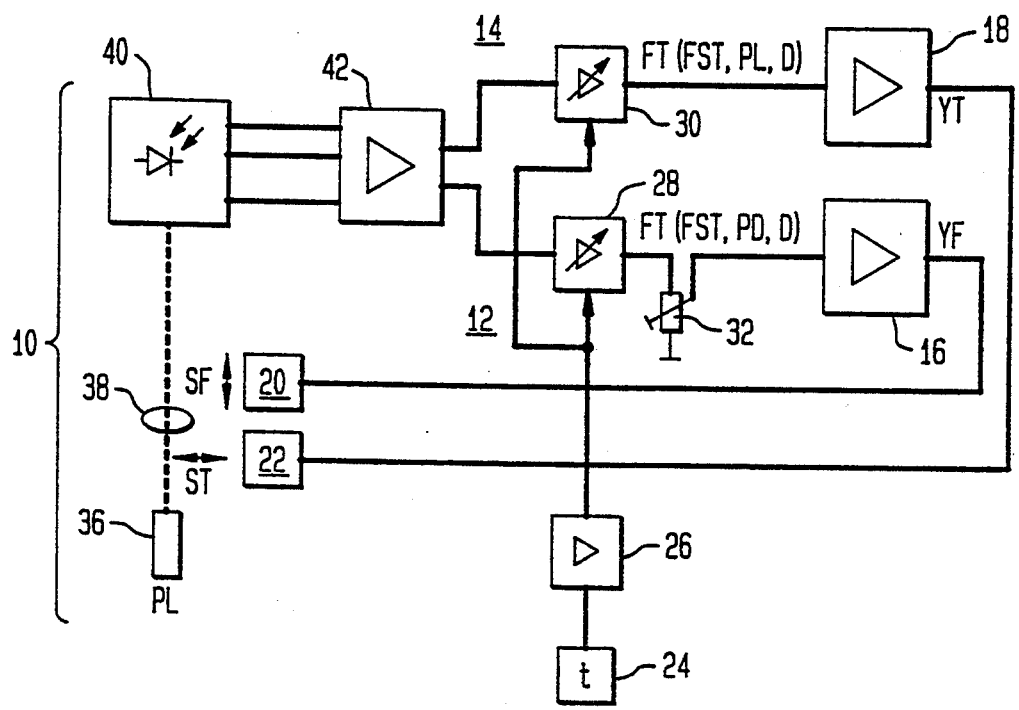
Figure 2:
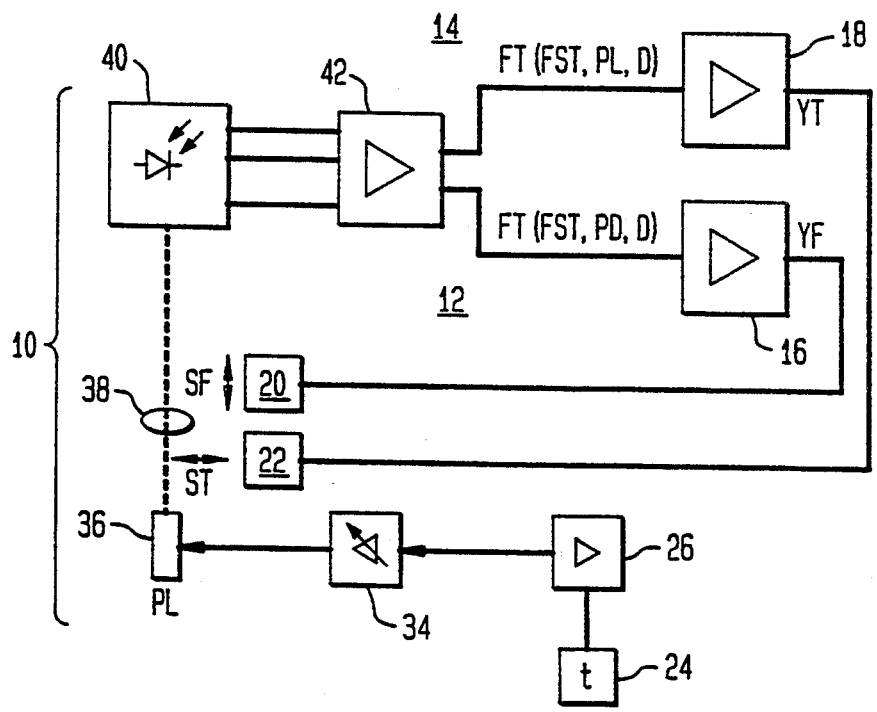

Common features of the circuit arrangements shown in FIGS. 1 and 2 comprise a scanning device 10 consisting of a laser light source 36, optics 38 and a group of photodetectors 40, an evaluating and preamplifier circuit 42, a control amplifier 16 of a first control loop 12 with a first actuator 20 for the focus correction and a control amplifier 18 of a second control loop 14 with a second actuator 22 for the track correction.

The circuit arrangements described thus far provide for an interference-free access to stored information items of an optical recording carrier, with the constraint of constant temperature conditions. A light beam radiated by the laser light source 36 is focused on the information plane of the recording carrier and directed onto an information track. The light beam reflected from the information track passes to a group of photodetectors 40. The focusing and precise alignment of the light beam on the recording carrier and the imaging on the photodetectors 40 are carried out by means of the optics 38. For reasons of simplification, the drawing only shows the virtual beam path from the laser light source 36 via the optics 38 to the photodetectors 40. The optics 38 can be mechanically displaced by means of the actuators 20 and 22 in a direction along their optical axis for focusing and in a direction perpendicular thereto for tracking.

If the optics 38 are located in their ideal position, information signals can be obtained by means of the evaluating and preamplifier circuit 42 and processed further by subsequent signal processing circuits, not shown here. In the case of deviations from the ideal position, error signals are generated by the evaluating and preamplifier circuit 42. A deviation of the focal point from the information plane by the amount FSF leads to an error signal FF, the magnitude of which depends on the degree of deviation, the power of the laser light source PL and the attenuation D of the scanning beam. If the scanning beam does not accurately impinge on the information track, an error signal FT is produced, the magnitude of which is dependent on the deviation FST from the track, the scanning power PD and the attenuation D of the scanning beam.

The error signals FF and FT pass to the control amplifiers 16 and 18, respectively. These generate control signals YF and YT for the actuators 20 and 22, respectively, which produce a mechanical displacement of the optics 38 by the amount SF and ST. In the ideal case, this displacement is exactly large enough for the deviation from the ideal position causing it to be just compensated for. For this purpose, the total gain in the respective control loop 12 and 14 respectively, the control gain, as one of the most important parameters of the stability of the control, must vary as little as possible over the entire operating range of the control.

To achieve this characteristic in spite of the temperature-dependent mechanical resistances of the bearings of the optics 38, the circuit arrangement according to FIG. 1 comprises controlling elements 28 and 30 in the first 12 and second control loop 14. These controlling elements 28, 30, which can also be integrated in the evaluating and preamplifier circuit 42, are connected to the output of a common gain controller 26 which, in turn, is supplied with signals from a temperature sensor 24. The temperature sensor 24 is preferably located in the vicinity of the bearings of the optics 38 or is thermally coupled to these.

The gain controller 26 has a control characteristic which varies in the opposite direction to the temperature/resistance characteristic of the bearings of the optics 38. If it is assumed that the bearings used have the same characteristics both during the displacement for focusing and during the movement for tracking, the assumption of identical temperature/resistance characteristics in both control loops 12, 14 is applicable. Using the common gain controller 26 therefore makes it possible to keep down the additional circuit expenditure and the expenditure for simulating the temperature/resistance characteristics.

The temperature sensor 24 transmits for each temperature value within a temperature range for which the compensation has been dimensioned a signal value to the gain controller 26. This controller allocates, in accordance with its control characteristic, a control value to the temperature value determined, which control value is used for setting the controlling elements 28, 30 in the control loops 12, 14. The controlling elements 28, 30 thus compensate for the control gain changed by the change in mechanical resistances of the bearings and thus provide control stability.

A voltage divider 32 additionally drawn-in in the block diagram makes it possible to adapt the control of the controlling elements 28, 30 when the temperature response in the two control loops 12, 14 has a different slope.

FIG. 2 shows another solution which achieves a constant control gain over the entire operating range of the control in spite of the temperature-dependent mechanical resistances of the bearings of the optics 38. The circuit arrangement shown comprises a controlling element 34 which controls the power PL of the laser light source 36. It would also be possible to control the attenuation D of the scanning beam or to combine both measures.

The controlling element 34 is connected to the output of a gain controller 26, analogously to the circuit arrangement in FIG. 1, which controller, in turn, is supplied with signals from a temperature sensor 24. This embodiment mandatorily results in a common, qualitatively identical control of the control gains in both control loops 12, 14.

Apart from an analogous simulation of the temperature/resistance characteristic of the bearings of the optics 38 by means of analog circuits, it is also possible to construct the gain controller 26 as a look-up table in which a stored output variable is allocated to each stepped input variable. This makes it possible to implement even complicated characteristics by simple means.

We claim:

1. A circuit for recording/reading an optical recording medium, comprising
    a scanning device (10), said scanning device having
    a first control circuit (12) for focusing a light beam directed on an information level of the recording medium and
    a second control circuit (14) for directing the light beam along an information track at said information level, wherein
    a temperature sensor (24) detects the temperature of bearings of an optical element of the scanning device (10), the mechanical mobility of which bearings is temperature-dependent, and wherein
    servo amplifiers (16, 18) of the control circuits (12, 14) trigger a first actuator (20) for focusing and a second actuator (22) for tracking,
    wherein
    the first and second actuators (20, 22) mechanically guide the optical element (38) of the scanning device (10), and
    a beam power controlling device (34) is provided, by means of which the intensity (PL) of the light beam directed on the recording medium is varied as a function of the temperature detected by the temperature sensor (24).

2. A circuit in accordance with claim 1, wherein
    said beam power controlling device (34) is controlled by a gain control (26) having a characteristic curve which compensates for temperature drift of the servo amplifiers (12, 14) over a predetermined temperature range.

3. A circuit in accordance with claim 2, wherein
    the gain control (26) is provided in the form of a look-up table wherein a stored output value is assigned to each stepped value of temperature of said sensor.

4. A circuit in accordance with claim 1, wherein
    the gain control (26) is provided in the form of a look-up table wherein a stored output value is assigned to each stepped value of temperature of said sensor.

* * * * *